(12) United States Patent
Durif et al.

(10) Patent No.: US 6,327,130 B1
(45) Date of Patent: Dec. 4, 2001

(54) CONTROL DEVICE OF A CIRCUIT BREAKER OPENING OR CLOSING ELECTROMAGNET WITH LOCAL AND REMOTE CONTROL

(75) Inventors: Ghislain Durif, Meylan; Jean-Pierre Nereau, Seyssinet-Pariset; Mustapha Chelloug, Echirolles, all of (FR)

(73) Assignee: Schneider Electric Industries S.A. (FR)

( * ) Notice: Subject to any disclaimer, the term of this patent is extended or adjusted under 35 U.S.C. 154(b) by 0 days.

(21) Appl. No.: 09/448,472

(22) Filed: Nov. 24, 1999

(30) Foreign Application Priority Data

Dec. 7, 1998 (FR) .................................................. 98 15556

(51) Int. Cl.⁷ .................................................. H01H 47/00
(52) U.S. Cl. .......................... 361/139; 361/152; 361/170; 361/187
(58) Field of Search .................................. 361/139, 143, 361/152, 160, 170, 179, 187, 64, 68–69, 86

(56) References Cited

U.S. PATENT DOCUMENTS

| | | | |
|---|---|---|---|
| 4,025,823 | * 5/1977 | Lang et al. | 361/111 |
| 4,446,501 | * 5/1984 | Peterson et al. | 361/114 |
| 4,597,025 | * 6/1986 | Rutchik et al. | 361/94 |
| 5,375,032 | * 12/1994 | Hatakeyama et al. | 361/187 |
| 5,627,415 | * 5/1997 | Charpentier et al. | 307/116 |
| 5,633,776 | * 5/1997 | Juncu et al. | 361/115 |
| 5,699,222 | * 12/1997 | Innes | 361/170 |
| 5,754,386 | * 5/1998 | Barbour et al. | 361/154 |
| 5,959,826 | * 9/1999 | Baurand et al. | 361/156 |
| 5,982,596 | * 11/1999 | Spencer et al. | 361/64 |

FOREIGN PATENT DOCUMENTS 2 536 904 6/1984 (FR) .
0 297 957 A1 1/1989 (FR) .

* cited by examiner

Primary Examiner—Michael J. Sherry
(74) Attorney, Agent, or Firm—Parkhurst & Wendel, L.L.P.

(57) ABSTRACT

The device comprises two power supply terminals, a local control terminal and remote control and presence detection terminals. It can operate in fully autonomous manner, the power supply terminals being connected to a voltage supply source by means of a local control switch, closing of which causes excitation of a coil of the electro-magnet. It can also operate in conjunction with a communication module. In this case, the terminals are permanently supplied by the source, the local control terminal is connected to one of the power supply terminals by a local control switch and the remote control and presence detection terminals are connected to the module. The device automatically detects the presence of the module and causes excitation of the coil if the supply voltage is sufficient and if a control signal is applied to it either by the local control switch or by the module.

5 Claims, 4 Drawing Sheets

CONTROL DEVICE OF A CIRCUIT BREAKER OPENING OR CLOSING ELECTROMAGNET WITH LOCAL AND REMOTE CONTROL

BACKGROUND OF THE INVENTION

The invention relates to a control device of a circuit breaker opening or closing electromagnet, the device comprising two power supply terminals and a remote control terminal.

Circuit breakers generally comprise a certain number of electrical auxiliaries, more particularly closing electromagnets (XF) or opening electromagnets, in particular shunt releases (MX).

Conventionally, these devices are operated by means of a pushbutton. As soon as the voltage applied to their power supply terminals is sufficient, they cause, depending on the case, opening or closing of the circuit breaker.

These devices can be remote controlled by means of a communication module, already present in the circuit breaker and connected to a remote control terminal of the auxiliary.

These two control modes have up to now been incompatible, the remote controlled auxiliary having to be permanently supplied.

SUMMARY OF THE INVENTION

The object of the invention is to achieve a control device of a circuit breaker opening or closing electromagnet not presenting these drawbacks.

According to the invention, this object is achieved by the fact that the device comprises a local control terminal and presence detection means connected to at least one presence detection terminal and designed to automatically detect connection of a communication module to the remote control and presence detection terminals of the device, so as to be able to operate either according to a first control mode, wherein the power supply terminals are connected to a voltage supply source by means of a first local control means, or according to a second control mode, wherein the two power supply terminals are connected directly to the voltage supply source, the local control terminal then being connected by means of a second local control means to one of the power supply terminals and the remote control and presence detection terminals being connected to the communication module. Simply connecting a communication module to the device enables the latter to automatically detect its presence and to modify its operating mode accordingly.

According to a development of the invention, the device comprises means for:
- comparing a quantity representative of the voltage applied to the power supply terminals with a preset threshold,
- detecting the presence of a communication module at the remote control and presence detection terminals, and
- commanding excitation of at least one coil of the electromagnet when said quantity is greater than said threshold, either automatically in the absence of detection of presence of a communication module, or, when said presence is detected, if a control signal is, in addition, applied to the remote control terminal or to the local control terminal.

According to a first embodiment, the device comprises a remote control terminal and two presence detection terminals, the presence detection terminals being short-circuited by connection of the communication module.

According to a second embodiment, the device comprises a remote control and presence detection terminal connected by means of a resistor to an auxiliary voltage supply of the device, and a reference terminal, the reference terminal and remote control and presence detection terminal being connected by a resistor of the communication module when connection of said module to said terminals is performed.

BRIEF DESCRIPTION OF THE DRAWINGS

Other advantages and features will become more clearly apparent from the following description of particular embodiments given as non-restrictive examples only and represented in the accompanying drawings in which.

DETAILED DESCRIPTION OF THE PREFERRED EMBODIMENT

Figure 1:
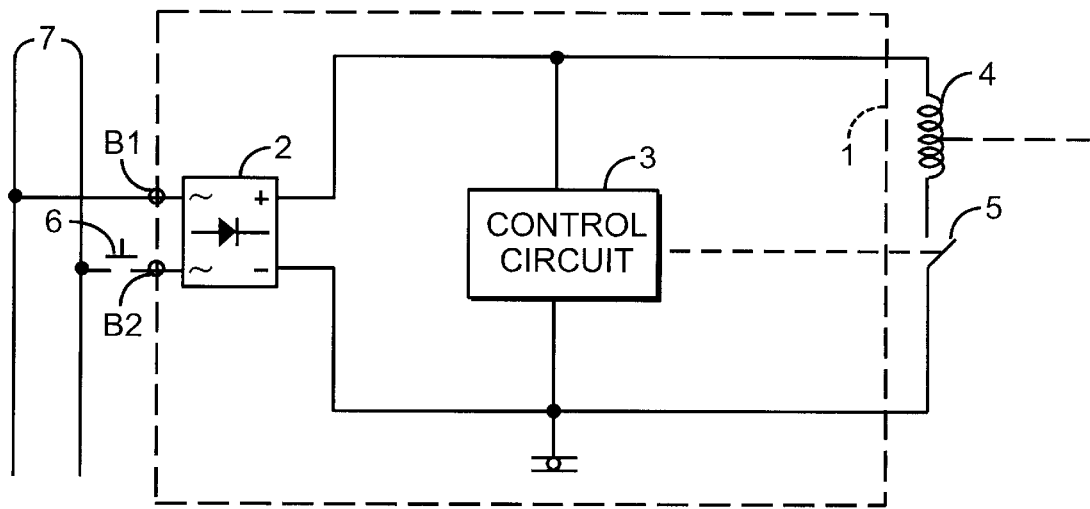
FIGS. 1 and 2 represent two electromagnet control devices according to the prior art.

FIG. 1 represents a control device 1 of an electromagnet of the type described in French Patent Application 2,133,652. This device 1 comprises two power supply terminals B1 and B2 connected to a full-wave rectifier 2, for example formed by a diode bridge. The DC output terminals of the rectifier supply a control circuit 3 and a coil 4 connected in series with an electronic switch 5. The switch 5 is operated by the control circuit 3. The coil 4 of the electromagnet controls opening or closing of the associated contacts (not represented) of the electromagnet when it is excited. The power supply terminals B1 and B2 are connected respectively directly and by means of a switch 6, formed by a pushbutton in FIG. 1, to an AC power supply system 7. When the switch 6 is closed, the control device 1 is supplied. The control circuit 3 then commands closing of the electronic switch 5 so that a relatively high inrush current followed by a lower holding current flows in the coil 4. This can be achieved either with a device comprising a single coil, in which the current is switched to constitute the holding current, or with a double coil formed by an inrush coil and a holding coil.

Figure 2:
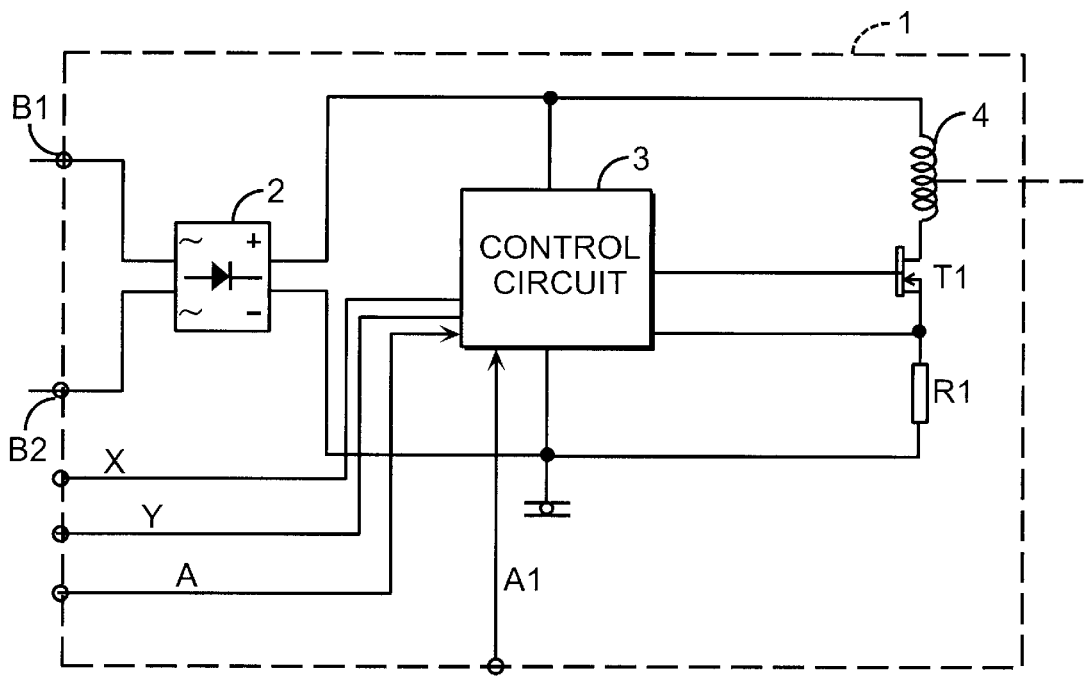

FIG. 2 represents a control device of a contactor of the type described in French Patent Application 2,617,634. The control device 1 comprises, like the previous one, a rectifier 2 connected to two power supply terminals B1 and B2 and a control circuit 3 connected to the output terminals of the rectifier. The control circuit 3 controls an electronic switch, formed by a MOS-type transistor T1 connected in series with the coil 4 and a measuring resistor R1 to the output terminals of the rectifier 2. The power supply terminals B1 and B2 are permanently connected to an AC power source. The control circuit 3 comprises a control input terminal A and two operating mode selection terminals X and Y. Two bits applied to the terminals X and Y enable the operating mode to be selected from three possible modes:
- autonomous operation, only according to the state of the contactor and the voltage applied to the power supply terminals B1 and B2,
- remote control by means of the input A,
- local control by means of the input A and an additional reinitialization input A1.

The control devices of the closing electromagnet (XF) and opening electromagnet (MX) of circuit breakers are generally of the type illustrated in FIG. 1. It has also been proposed to control such auxiliaries remotely, the control circuit then receiving a control signal from a communication module. In the first case, only autonomous operation is possible, whereas in the second case, only remote controlled operation can be performed.

According to the invention, a single auxiliary must be able to be used either in isolated manner in a local control mode, or in combination with a communication module in a local and/or remote control mode.

The device according to FIG. 2 is not suitable as it requires at least three external signals (X, Y, A1) to determine the required operating mode.

Figure 3:
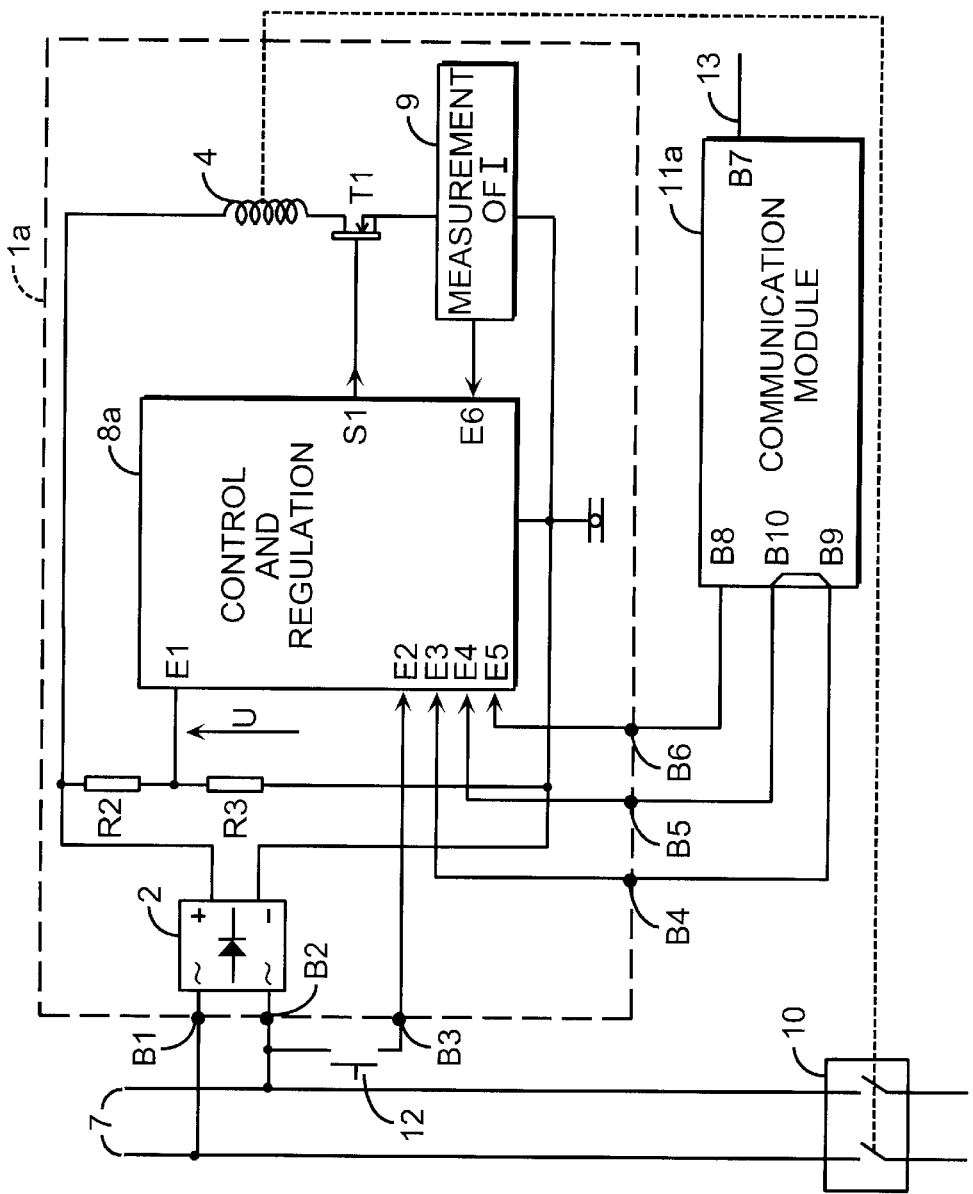
FIGS. 3 and 4 represent two particular embodiments of a device according to the invention.

The embodiment of the control device 1a of FIG. 3 comprises, like the previous ones, a rectifier 2 connected to two power supply terminals B1 and B2. The rectifier 2 supplies a control and regulation circuit 8a and at least one coil 4 connected in series with an electronic switch (transistor T1) and a circuit 9 for measuring the current I flowing in the coil 4.

The control and regulation circuit 8a comprises a first input E1 to which a signal U is applied representative of the voltage applied between the terminals B1 and B2. In FIG. 3, a resistive voltage divider is formed by two resistors R2 and R3 connected in series to the output of the rectifier 2. The mid-point of the voltage divider, common to the resistors R2 and R3, is connected to the input E1.

The circuit 8a comprises four other inputs E2 to E5, respectively connected to a local control terminal B3 of the device 1a, to two presence detection terminals B4 and B5, and to a remote control terminal B6 of the control device 1a. It also comprises a regulation input E6, connected to the output of the circuit 9 for measuring the current I, and a control output S1 connected to the control electrode of the transistor T1.

In FIG. 3, the coil 4 commands opening of a circuit breaker 10 connected to the conductors of the power system 7 if the auxiliary involved is a shunt release (MX) or closing thereof if a closing electromagnet (XF) is involved.

If the auxiliary has to operate in local mode only, the control device 1a is connected as in FIG. 1 to the power system 7. One of its power supply inputs, for example B1, is connected directly to one of the conductors of the power system 7, the other (B2) being connected to the other power system conductor by means of a switch 6. In this case, the other terminals B3 to B6 of the control device are not used. Closing of the switch 6 causes excitation of the coil 4.

If on the other hand the auxiliary has to operate in conjunction with a communication module 11a, the terminals B4 to B6 are connected to the module 11a and the two power supply terminals B1 and B2 are connected directly to the power system 7, so as to supply the device 1 permanently. To enable local control as well, the terminal B3 can be connected by means of a local control switch 12 to one of the conductors of the power system 7. In practice, as represented in FIG. 3, the terminal B3 is connected to one of the power supply terminals (B2 in the figure) by means of the switch 12, formed for example by a pushbutton.

The communication module 11a comprises a terminal B7 for connection to a bus 13. This bus may be of any known type, for example of the JBUS, Batibus, FIP, etc. type. The communication module 11a also comprises a remote control terminal B8 designed to be connected to the terminal B6 of the control device 1a, and two presence indication terminals B9 and B10 designed to be connected respectively to the terminals B5 and B6. The terminals B9 and B10 are short-circuited inside the module 11a.

Figure 4:
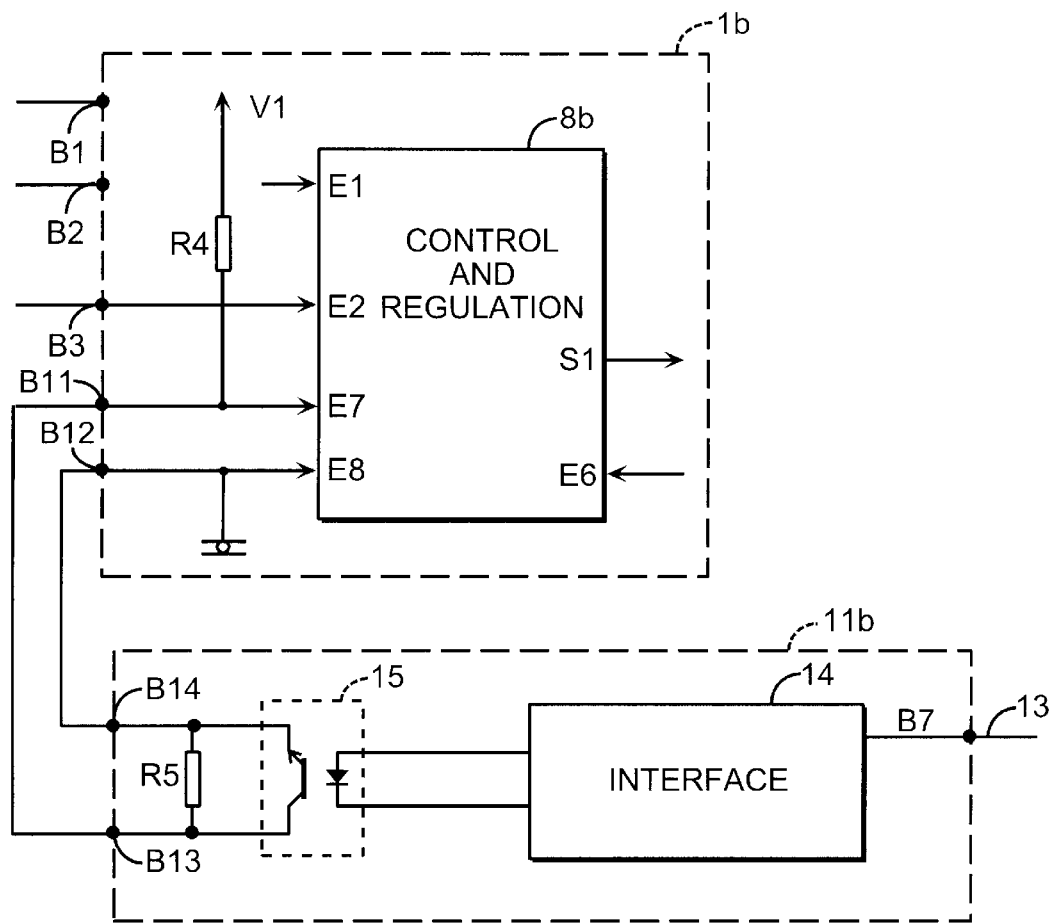

In the particular embodiment of FIG. 4, only the elements indispensable for understanding are represented. The control device 1b still comprises two power supply terminals B1 and B2 and a local control terminal B3. However, it now only comprises two remote control and presence detection terminals B11 and B12, respectively connected to inputs E7 and E8 of the control and regulation circuit 8b. The input E8, acting as reference, is grounded. The terminals B11 and E7 are connected inside the control device 1b, by means of a resistor R4, to an auxiliary supply voltage V1, for example about 5V, obtained by any suitable means, voltage regulation for example, from the output DC voltage of the rectifier 2.

The control device 1b is designed to be connected to a communication module 11b comprising a terminal B7 for connection to a bus 13 and two remote control and presence indication terminals B13 and B14 designed to be connected respectively to the terminals B11 and B12. In the module 11b, the terminal B7 is connected to an interface 14 itself connected, by means of an electro-optic coupler 15, to the terminals B13 and B14. A resistor R5 is connected in parallel on the output of the coupler 15 between the terminals B13 and B14. The load-side part of the coupler 15 of the communication module 11b is supplied by the voltage V1 of the control device 1b.

Figure 5:
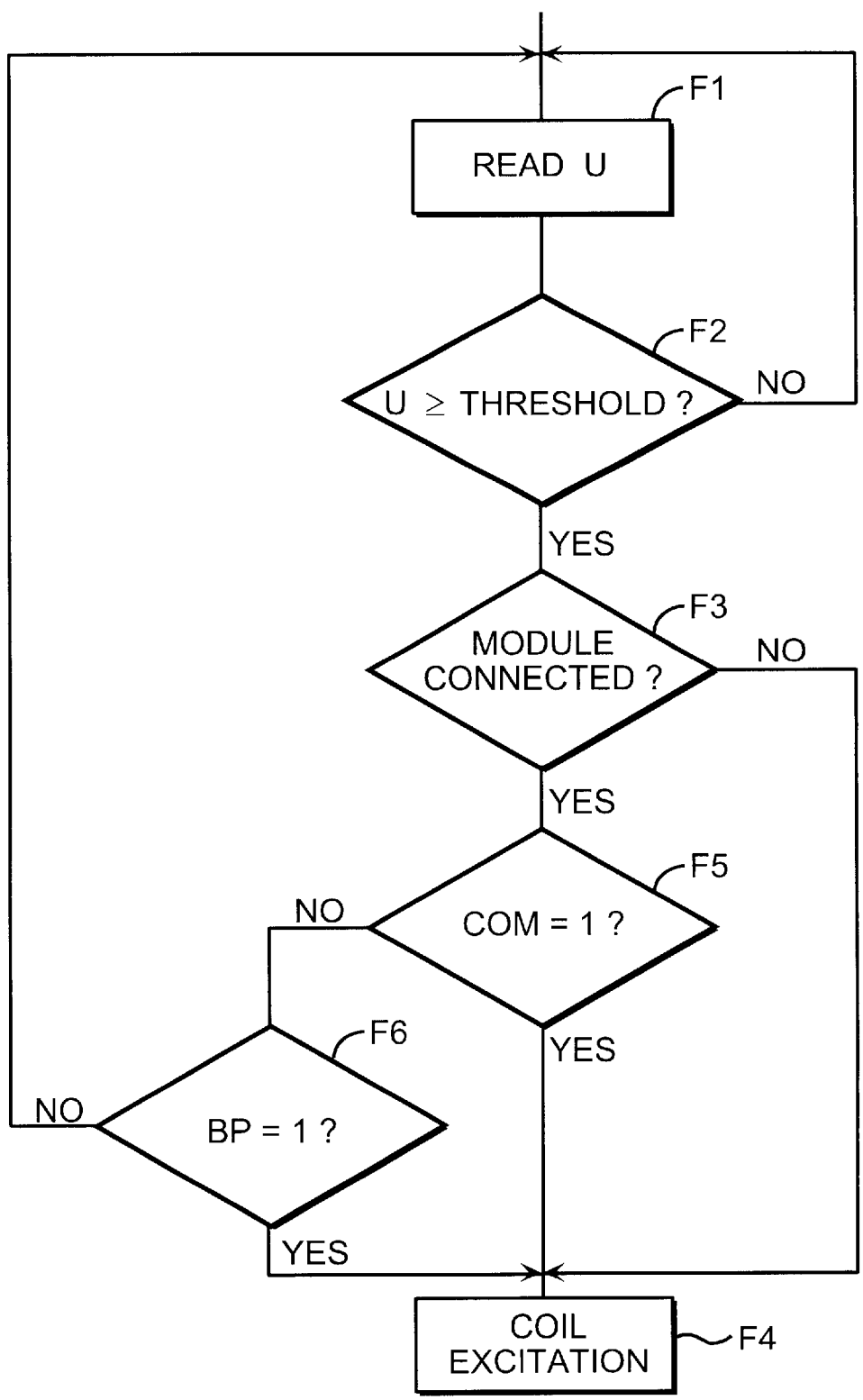
FIG. 5 represents a flowchart of operation of a device according to the invention.

The control devices 1a and 1b operate in the manner described above with reference to FIG. 5 which represents a flowchart of operation of a microprocessor forming part of the circuits 8a and 8b.

In a first step F1 the microprocessor of the control and regulation circuit 8a or 8b reads the voltage U applied to the input E1. This voltage U, representative of the voltage at the terminals of the resistor R3, is in fact representative of the voltage applied to the power supply terminals B1 and B2. In a second step F2, the microprocessor compares the voltage U with a preset threshold representative of an inrush voltage threshold. If the voltage U is lower than the threshold (NO output of F2) the microprocessor loops back to step F1. If on the other hand the voltage U is equal to or greater than the threshold, the microprocessor goes on to a step F3. In the step F3 it checks whether a communication module is connected to the control device 1a or 1b.

In the embodiment of FIG. 3, the presence of the communication module 11a is detected when there is a short-circuit between the terminals E3 and E4, respectively connected to the terminals B4 and B5 of the device 1a and to the terminals B9 and B10 of the communication module 11a. In the embodiment of FIG. 4, the presence of the communication module 11b is detected when the voltage applied to the input E7 takes a certain preset value. If the resistors R4 and R5 are equal, in the absence of the module 11b, the voltage applied to the input E7 is equal to V1. On the other hand, in the presence of the module 11b, this voltage is equal to V1/2. It should be noted that in this case, the communication signals applied by the communication module 11b to the circuit 8b can take two logic values, corresponding respectively to the voltage V1/2 when the coupler 15 is inactive and to the voltage 0 when the coupler 15 is active, short-circuiting the resistor R5 and consequently the terminals B13 and B14. The terminal B12 thus acts as reference terminal for the terminal B11 which is used both as remote control terminal and as presence detection terminal.

In the absence of detection of a communication module being connected to the control device (NO output of F3), i.e. if the inputs E3 and E4 are not short-circuited (FIG. 3) or if the voltage applied between the inputs E7 and E8 is equal to V1, the microprocessor goes on to a coil excitation step F4. This step can be performed in any suitable, known, manner, for example by excitation of the coil by a relatively high inrush current during a certain time, and then by a lower holding current. This can be achieved either with a device comprising a single coil, in which the current is switched to constitute the holding current, or with a double coil formed by distinct inrush and holding coils.

This operation then corresponds to conventional operation, in purely local mode, of a control device of a circuit breaker opening and closing electromagnet. In the absence of a communication module, a sufficient voltage is in fact applied to the power supply terminals B1 and B2 when a local control switch 6 arranged line-side from one of the terminals B1 and B2 is closed.

When the microprocessor detects the presence of a communication module (YES output of F3) it goes on to a step F5 where it checks if it receives a remote control order (COM=1). In the embodiment of FIG. 3, such an order is applied to the input E5 by means of the terminals B6 and B8. In the embodiment of FIG. 4, such an order is constituted for example by application of a short-circuit between the inputs E7 and E8 caused by activation of the coupler 15. Naturally, such an order can, in both embodiments, also be constituted by a sequence of bits rather than by a single bit.

If a remote control order is received (YES output of F5), the microprocessor goes on to the step F4 of coil excitation. In the absence of a remote control order on the other hand (NO output of F5), the microprocessor checks, in a step F6, if a local control order (BP=1) is applied to the device. In the embodiments represented, such an order is applied to the device when the local control switch 12 is closed. If such an order is applied (YES output of F6), the microprocessor goes on to the step F4 of coil excitation. If not (NO output of F6) it returns to the step F1.

The steps F5 and F6 can be reversed without modifying the operation of the overall assembly. The essential thing is that, when a communication module (11a, 11b) is connected, the device automatically takes into account both the remote control orders and the local control orders if any. Prior checking of the value of the voltage U enables such an order to be taken into account only when the voltage applied to the power supply terminals is sufficient to ensure correct operation of the electromagnet.

The control device according to the invention can thus operate either in autonomous manner in local mode, or when it is connected to a communication module in a local and/or remote mode. In autonomous operation in local mode, closing of a local control switch automatically causes supply of the device by the power supply terminals B1 and B2 and excitation of the electromagnet. In operation with a communication module, the device is supplied permanently by its power supply terminals B1 and B2 and can be controlled either locally or remotely. Simply wiring the communication module up to the control device enables the latter to detect the presence of the communication module and to know that it must not operate in autonomous manner but cause actuation of the electromagnet only when a remote control order or a local control order is received, provided that the supply voltage is sufficient to ensure correct operation of the electromagnet.

In the embodiments described above, the local control switch is formed by a switch, for example of the pushbutton type. The invention also applies to the case where this control is performed by other means, for example by a programmable controller output, which may be constituted by an opto-coupler. The term local does not means that the local control switch has to be located in close physical proximity to the control device. It is used in opposition to remote control by means of a communication module. The remote control means (6 or 12) enables a power source to be connected, or not, by wiring to the power supply terminals B1 or B2 or to the local control terminal B3. The means 6 and 12 may be physically located at a distance (several miles) from the device.

In the above figures the power system is an AC power system. The invention also applies in the case where the control device is supplied with DC current, the rectifier 2 then becoming unnecessary.

What is claimed is:

1. A control device of a circuit breaker opening or closing electromagnet, a device comprising two power supply terminals and a remote control terminal, the device comprising a local control terminal and presence detection means connected to at least one presence detection terminal and designed to automatically detect connection of a communication module to the remote control terminal and the at least one presence detection terminal of the device, so as to be able to operate either according to a first control mode, wherein the power supply terminals are connected to a voltage supply source by means of a first local control means, or according to a second control mode, wherein the two power supply terminals are connected directly to the voltage supply source, the local control terminal then being connected by means of a second local control means to one of the power supply terminals and the remote control terminal and the at least one presence detection terminal being connected to the communication module.

2. The device according to claim 1, comprising means for:
   comparing a quantity representative of the voltage applied to the power supply terminals with a preset threshold,
   detecting the presence of a communication module at the remote control terminal and the at least one presence detection terminal, and
   commanding excitation of at least one coil of the electromagnet when said quantity is greater than said threshold, either automatically in the absence of detection of presence of a communication module, or, when said presence is detected, if a control signal is, in addition, applied to the remote control terminal or to the local control terminal.

3. The device according to claim 2, comprising a resistive voltage divider connected to the power supply terminals and comprising a mid-point connected to an input of a microprocessor-based circuit comprising said means for comparing, detecting presence and commanding.

4. The device according to claim 1, wherein said remote control terminal and said at least one presence detection terminal comprise one remote control terminal and two presence detection terminals, the presence detection terminals being short-circuited by connection of the communication module.

5. The device according to claim 1, wherein said remote control terminal and said at least one presence detection terminal comprise one remote control and presence detection terminal connected by means of a resistor to an auxiliary voltage supply of the device, and a reference terminal, the reference terminal and remote control and presence detection terminal being connected by a resistor of the communication module.

* * * * *